United States Patent [19]

Kurabayashi et al.

[11] 4,402,483
[45] Sep. 6, 1983

[54] EARTHQUAKE ISOLATION FLOOR

[75] Inventors: Hiroshi Kurabayashi, Tokyo; Kozo Sakaba, Matsudo, both of Japan; Takafumi Fujita, 1-8-2-207, Saiwai-cho, City of Chiba, Chiba Prefecture, Japan

[73] Assignees: Mitsubishi Steel Mfg. Co., Ltd.; Takafumi Fujita, both of Tokyo, Japan

[21] Appl. No.: 199,980

[22] Filed: Oct. 23, 1980

[30] Foreign Application Priority Data

Nov. 12, 1979 [JP] Japan .................................. 54-145419

[51] Int. Cl.³ ........................ E04H 9/02; E02D 27/34
[52] U.S. Cl. .................................... 248/636; 248/559; 248/638; 52/167
[58] Field of Search ............... 248/636, 638, 615, 559; 52/167; 188/378

[56] References Cited

U.S. PATENT DOCUMENTS

| | | | |
|---|---|---|---|
| 2,055,000 | 9/1936 | Bacigalupo | 52/167 |
| 3,250,508 | 5/1966 | Kfoury et al. | 188/378 |
| 3,351,307 | 11/1967 | Michel et al. | 248/636 |
| 3,464,657 | 9/1969 | Bullard | 248/638 |
| 3,748,800 | 7/1973 | Glicksberg | 52/167 |
| 3,977,140 | 8/1976 | Matsudaira et al. | 52/167 |
| 4,040,590 | 8/1977 | Baratoff | 248/615 |
| 4,101,102 | 7/1978 | Lloyd | 248/636 |
| 4,223,762 | 9/1980 | Gertal | 248/638 |
| 4,226,677 | 10/1980 | Saito et al. | 52/167 |
| 4,240,141 | 12/1980 | Vasiliev et al. | 248/638 |

FOREIGN PATENT DOCUMENTS

| | | | |
|---|---|---|---|
| 52-103823 | 8/1977 | Japan . | |
| 54-77532 | 6/1979 | Japan . | |
| 1196335 | 6/1970 | United Kingdom | 248/615 |
| 615309 | 7/1978 | U.S.S.R. | 248/638 |
| 746045 | 7/1980 | U.S.S.R. | 52/167 |

Primary Examiner—Victor N. Sakran
Attorney, Agent, or Firm—Amster, Rothstein & Engelberg

[57] ABSTRACT

An earthquake isolation floor comprises a horizontal plate-like support frame having a generally circular or polygonal configuration, a support frame having a horizontal surface with a similar configuration to that of the fundamental frame in a plan view, but of relatively smaller dimensions, a number of horizontal springs disposed radially between the fundamental and support frames with each of the springs being kept in a preset state, and a number of horizontal dampers disposed radially between the fundamental and the support frames, whereby machinery and tools, etc. to be protected against vibration such as caused by an earthquake are adapted to be mounted on the support frame.

14 Claims, 5 Drawing Figures

EARTHQUAKE ISOLATION FLOOR

BACKGROUND OF THE INVENTION

The present invention relates to an earthquake isolation floor and more particularly to an earthquake isolation floor particularly adapted for keeping machinery and tools, etc. to be mounted thereon free from vibration such as caused when they are subjected to an earthquake, or the like.

For instance, electronic computers, emergency dynamos, dangerous objects (e.g. dynamite, chemicals, etc.), etc. should continue to operate or be stored in safety even during an earthquake. From this poinrt of view there is considerable attention being paid to anti-earthquake or anti-vibration means for support frames to mount machinery and tools, etc. and for places for storing dangerous objects.

Countermeasures against vibration can be divided into two kinds at present:

(1) Such equipment as atomic energy plants, spherical tanks, electrical substations, etc. are originally designed against earthquakes by examining them structurally so that they will have sufficient strength against seismic input, and increasing their strength.

(2) Machinery and tools, dangerous objects, etc. are secured on a floor which is mounted on springs such that the springs absorb the seismic input when such occurs so that the machinery and tools, etc. can be kept free from danger, such a floor being referred to as a so-called "earthquake isolation floor".

The present invention relates in particular to the latter, i.e. the "earthquake isolation floor".

Hitherto earthquake isolation floors have comprised a sliding plate, a support frame slidably mounted on the plate with low friction elements being interposed therebetween, a number of springs disposed horizontally between the support frame and a foundation on which the sliding plate is laid, a floor mounted on the support frame through springs disposed vertically, a number of dampers disposed vertically between the support frame and the floor, and a latch means to secure the vertical springs during normal periods. In this earthquake isolation floor the vertically arranged springs are constituted such that they are brought into operation only after the latch means is released due to the onset of a seismic input greater than a predetermined value.

Thus, in this hitherto known earthquake isolation floor, upon the onset of a seismic input greater than a predetermined value, the latch means is released to cause the vertically arranged springs to be operated, but, the reset of the vertically arranged springs as necessitated after the earthquake has ceased is very difficult, and, further, the reset is rendered impossible should the vertically arranged springs have become misaligned with their spring seats following a large seismic input, and the floor will be placed in an unstable state. Moreover, it is complicated in constitution, and having no dampers in the horizontal direction, the damping of vibration caused by the occurance of an earthquake is delayed. Further, since the center of gravity of the earthquake isolation floor after securing the machinery and tools, etc. thereon becomes high, the floor may be subjected to a rocking vibration during an earthquake. In addition, since, with horizontally directed earth tremors, not only the horizontally arranged springs, but also the transversal rigidity of the vertically arranged springs has a large influence on the vibration prevention properties of the floor, the establishment of the spring constant in the horizontal direction is difficult and it is difficult to estimate the effectiveness of the floor during an earthquake.

SUMMARY OF THE INVENTION

It is an object of the present invention to provide a new and improved earthquake isolation floor which can do away with all of the defects of the hitherto known floor as abovementioned.

It is another object of the present invention to provide an erthquake isolation floor in which the force at which the springs arranged horizontally are brought into operation when the floor is subjected to an earthquake can be pre-adjusted.

It is a further object of the present invention to provide an earthquake isolation floor which is provided with a rocking prevention means.

It is still a further object of the present invention to provide an earthquake isolation floor which is simple in constitution and yet high in reliability.

In accordance with the present invention an earthquake isolation floor is provided which comprises a plate-like fundamental frame, a support frame slidably mounted on the fundamental frame so as to mount thereon machinery and tools, etc. to be protected against vibration and having a horizontal surface with a configuration similar to that of the fundamental frame, but of a relatively smaller dimension, a number of horizontal springs disposed between the fundamental frame and the support frame with each of the springs in a precompressed state, and a number of horizontal dampers disposed between the fundamental frame and the support frame.

According to one aspect of the present invention the support frame of the earthquake isolation floor has its outer periphery surrounded by a vertical wall secured to the fundamental frame with a gap being left therebetween, whereby the gap is adapted to house the horizontal springs and the horizontal dampers.

In a preferred embodiment of the present invention the vertical wall secured to the fundamental frame has its upper edge provided with a substantially annular cover plate such that its inner peripheral portion overlaps the upper surface of the support frame over a substantial width with a small gap being left therebetween, whereby the cover plate cooperates with the support frame to act as a rocking prevention means for the support frame at the same time acts as a dust cover to prevent dust from entering into the sliding surface between the fundamental frame and the support frame.

Further, the present invention contemplates also that the earthquake isolation floor is constituted as a unit so that a number of the units may be adapted to carry a common support frame thereon in association with each other, whereby the common support frame is adapted to have secured thereon machinery and tools, etc. to be prevented from vibration, of relatively large dimensions or numbers.

The advantages obtainable from the earthquake isolation floor according to the present invention are as follows:

(1) A fixing means for preventing the floor from being brought into operation during normal periods is not required;

(2) Since the horizontal springs are mounted in the floor in a precompressed state, they are brought into operation only when an earthquake of a force of above a predetermined value, or the like, occurs, and the preset value of the spring is adjustable;

(3) Due to provision of the horizontal dampers, the damping of the vibration in that direction is rapid;

(4) Since the rocking prevention means and a cover for dust-prevention are provided, the sliding face between the fundamental and the support frames is always kept stable;

(5) After being subjected to a seismic input, etc. there is no subsequent resetting manipulation required to restore the floor, so operation may be recommenced directly after the seismic input, unlike the conventional earthquake isolation floor in which a resetting operation is necessary; and (6) Compared with a conventional floor, the present floor is simple in constitution and has higher reliability with regard to unpredictable seismic inputs, etc.

It is another important feature of the earthquake isolation floor according to the present invention that it can be easily constituted as a unit so that one or more of the units can be easily mounted below a support frame for transforming equipment, spherical tanks, etc. so that these may be protected from vibration.

BRIEF DESCRIPTION OF THE DRAWINGS

The above and other objects of the present invention will be more fully understood by reference to the following detailed description of the presently preferred, but nonetheless illustrative embodiments, in accordance with the present invention, when taken in conjunction with the accompanying drawings, wherein.

DESCRIPTION OF PREFERRED EMBODIMENTS

Figure 1:
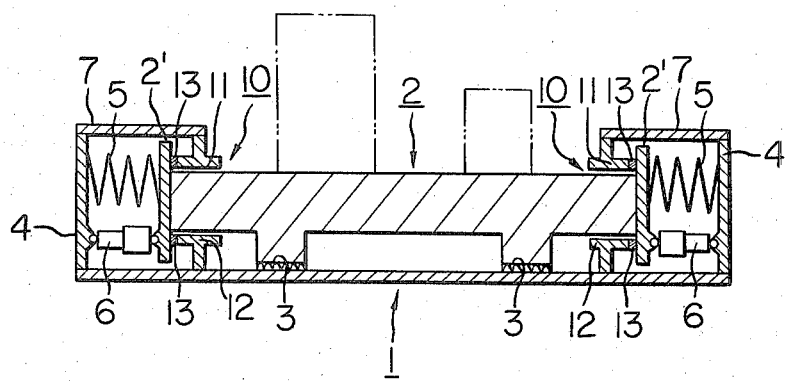
FIG. 1 shows a schematical representation of one embodiment of the present invention in a sectional view.
Figure 2:
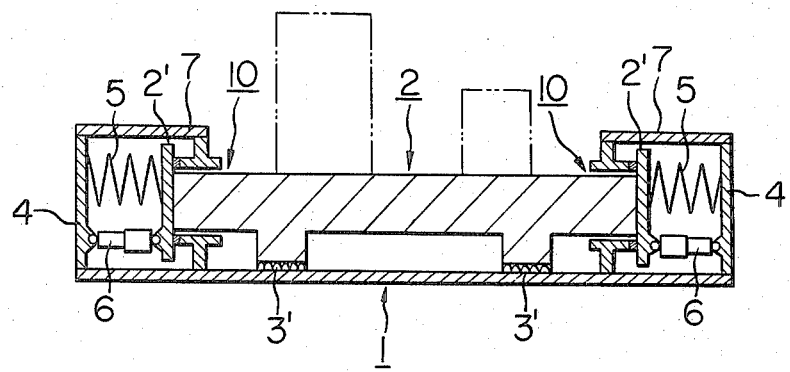
FIG. 2 is a similar view to FIG. 1 showing another embodiment of the present invention.

Referring now to FIGS. 1 and 2 of the attached drawings, schematically shown is an embodiment of the present invention comprising a horizontal fundamental frame 1 having a circular or polygonal plate-like configuration and a support frame 2 having a horizontal surface with a similar configuration in plane view to that of fundamental frame 1, but of smaller dimensions, and adapted to support thereon machinery and tools, etc. to be protected against vibration, whereby support frame 2 is horizontally disposed on the upper surface of fundamental frame 1 through sliding faces 3 having a low coefficient of friction formed on the bottom surface of support frame 2. Fundamental frame 1 has its outer periphery provided with a vertical wall having a height substantially protruding over the upper surface of support frame 2 so as to leave a gap between the inner surface of vertical wall 4 and the confronting outer periphery of support frame 2. Support frame 2 has its outer periphery fixedly secured to a vertical wall 2' having a height less than that of vertical wall 4 of fundamental frame 1 with a small gap being left between its under end periphery and the upper surface of fundamental frame 1. Disposed within a gap formed between the outer periphery of vertical wall 2' of support frame 2 and the inner periphery of vertical wall 4 of fundamental frame 1 are one or more horizontal seismic force absorption springs 5 arranged substantially radially in relation to the center axes of fundamental and support frames 1 and 2 with each of springs 5 being in a suitably precompressed state, whereby both ends of each of springs 5 are fixedly mounted to vertical walls 2' and 4, respectively, in a suitable manner. Additionally, a number of dampers 6 to effectively damp the vibration in the horizontal direction are also disposed between vertical walls 2' and 4 with the ends of each of dampers 6 being suitably supported by walls 2', 4, dampers 6 acting to restore support frame 2 to its original position quickly when springs 5 are activated.

Thus, in the present invention, support frame 2 for mounting machinery and tools, etc. thereon so as to be free from vibration has attached to its outer periphery a plurality of horizontal springs 4 and dampers 6 and the bottom surface of support frame 2 is provided with sliding faces 3 having a low coefficient of friction, whereby, in FIG. 1 sliding faces 3 are shown as being realized by a sliding friction, whereas, in FIG. 2 sliding faces 3' are shown as being realized by a rolling friction. As to the coefficient of friction of sliding faces 3 or 3' this should preferably be small since if it is too large, it affects the action of preset horizontal springs 5. Further, in the present invention, in order that the machinery and tools, etc. mounted on support frame 2 are prevented from being subject to large rocking vibrations when a seismic input is applied thereto, a rocking prevention means 10 is provided which comprises a pair of confronting annular ribs 11 and 12 that are respectively disposed above and below support frame 2 at a portion somewhat inward from its outer periphery with a small gap being left therebetween, respectively, whereby upper rib 11 is fixedly secured to the inner periphery of an annular cover plate 7 which is fixedly secured at its outer periphery to the upper end periphery of vertical wall 4 of fundamental frame 1, whereas lower rib 12 is fixedly secured to the upper surface of fundamental frame 1. Interposed between the outer peripheral end surfaces of upper and lower annular ribs 11, 12 and the confronting inner peripheral surface of vertical wall 2' of support frame 2 are damping means 13, respectively, made of a suitable material.

Thus, it will be appreciated that since, in the present invention, horizontal springs 5 and horizontal dampers 6 arranged around support frame 2 are housed within a sealed space formed by fundamental frame 1, vertical wall 4, cover plate 7 and upper and lower ribs 11, 12 and since sliding faces 3 and 3' of support frame 2 are surrounded by support frame 2 and upper and lower ribs 11, 12, horizontal springs 5, horizontal dampers 6 and sliding faces 3 and 3' are all protected from dust. Thus, it will be apparent that rocking prevention means 10 serves also as a dust-prevention cover for sliding faces 3 and 3'. In contrast with this, in the conventional earthquake isolation floor no countermeasure comparable with the rocking prevention means of the present invention was provided and also nothing was provided to protect the sliding faces from dust. However, since there is usually a considerable time after installation until a earthquake isolation floor shows its effect, if the sliding face happens to have been tainted by foreign matters accumulated on the sliding face, the predetermined effect will initially not be achieved. In the present invention, with the object of eliminating such a problem, rocking prevention means 10 which also acts as a dust-prevention cover is provided.

Figure 3:
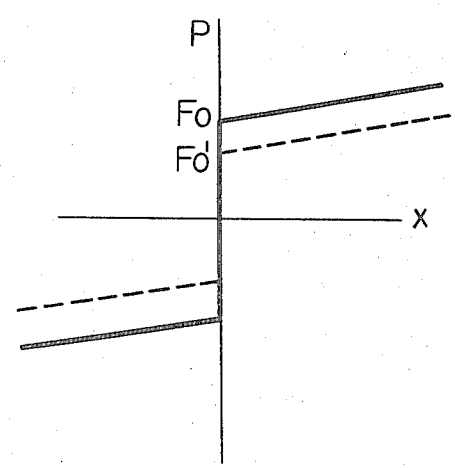
FIG. 3 is a diagram showing the relationship between the deflection and the load of the horizontal spring shown in FIG. 1 or 2.

In the present invention, the rigidity of each of horizontal springs 5 arranged around support frame 2 is designed so that they have a sufficiently large period relative to the input frequency of an earthquake or the floor response. Further, horizontal springs 5 are preset so as to have the load characteristic as qualitatively represented in FIG. 3, the adjustment of the preset load Fo or Fo' being variable analogously. That is, if it is assumed that the preset load Fo=0.25 W, springs 5 are brought into operation when a seismic force above 250 Gal is applied thereto, while, if it is assumed that the preset load Fo'=0.10 W, springs 5 are brought into operation when they are subjected to a seismic force above 100 Gal. Since the present invention is based on this principle, there is no need for securing during normal periods, as was required in the conventional earthquake isolation floor.

Figure 4:
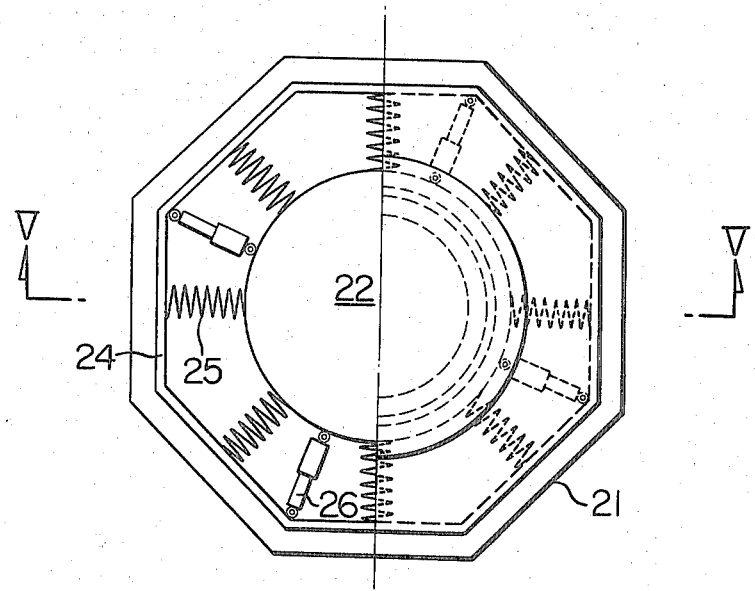
FIG. 4 is a sectional view of a earthquake isolation floor according to the present invention which is embodied as a unit taken along the line IV—IV of FIG. 5.
Figure 5:
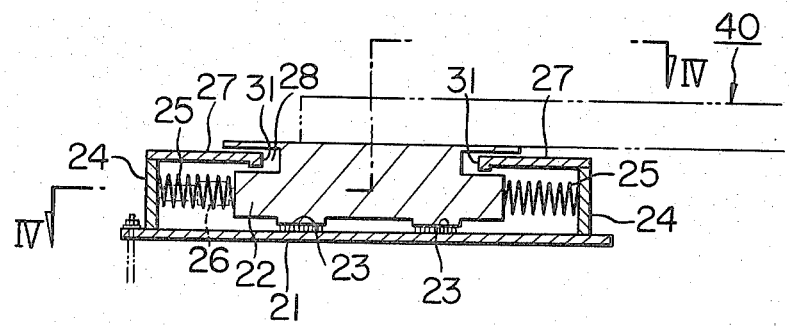
FIG. 5 is another sectional view of the unit shown in FIG. 4 taken along the line V—V of FIG. 4.

FIGS. 4 and 5 show another embodiment of the present invention wherein a earthquake isolation floor having relatively large dimensions is realized by utilizing a number of earthquake isolation floors each having a similar constitution to that shown in FIG. 1 or 2 with a common support frame being adapted to be mounted on the earthquake isolation floors each acting as an earthquake isolation floor unit to bear the common support thereon.

In the embodiment shown in FIGS. 4 and 5, disposed within a horizontal fundamental frame 21 having a polygonal configuration in plane view, e.g. an octagonal form, is a support frame 22 having a circular configuration in plan view such that support frame 22 is movably laid on fundamental frame 21 by a sliding face 23 formed on the bottom of frame 22, a number of horizontal springs 25 being radially disposed between vertical walls 24 constituting the respective sides of octagonal fundamental frame 21 and the outer periphery of circular support frame 22, disposed generally centrally of fundamental frame 21, with each of springs 25 being suitably preset, and a number of horizontal dampers 26 are also disposed radially between vertical walls 24 and the outer periphery of support frame 22. In the embodiment shown, horizontal springs 25 are shown each arranged at the mid point of the respective vertical walls, whereas horizontal dampers 26 are arranged on the radial lines passing through every other apex of the polygonal configuration of fundamental frame 21. Also in this embodiment, a cover plate 27 having a substantially annular configuration is fixedly secured at its outer periphery to the upper end edges of vertical walls 24 with a downwards directed annular rib 31 being formed around its inner periphery, whereby a small gap is left between the under surface of rib 31 and the upper surface of support frame 22 so that they constitute a rocking prevention means. Further, support frame 22 is formed with its outer peripheral portion containing an annular groove 28 so as to leave small gaps between it and the upper surface of cover plate 27 as well as its inner periphery, whereby dust, etc. is prevented from reaching sliding face 23 of support frame 22. In use, a number of the earthquake isolation floor units each having a constitution as above described are set on a foundation with appropriate spaces being left between them and common support frame 40 is mounted on support frames 22 of the respective units, whereby machinery and tools, etc. to be protected against vibration are mounted on common support frame 40 and they can be effectively prevented from being subjected to any vibration such as that due to an earthquake in a manner quite similar to that with the earthquake isolation floor as shown in FIG. 1 or 2.

It is to be understood that although certain forms of this invention have been illustrated and described, it is not to be limited thereto except so far as such limitation is included in the following claims:

What is claimed is:

1. An earthquake isolation floor comprising:
   a generally flat, horizontal fundamental frame having a pre-determined configuration and an outer periphery;
   a support frame smaller than said fundamental frame, said support frame being slidably mounted to said fundamental frame;
   a vertical wall disposed above said fundamental frame, and near said periphery of said fundamental frame;
   a plurality of horizontal pre-stressed springs disposed about said support frame, each said spring having a first and a second end, said first end being in contact with said vertical wall, and said second end being in contact with said support frame;
   an annular cover plate disposed above said support frame, the outer edge of said cover plate being connected to said vertical wall;
   a plurality of upper ribs disposed above said support frame and connected to the inner edge of said cover plate; and
   a plurality of lower ribs disposed below said support frame and connected to the upper surface of said fundamental frame;
   whereby said upper and lower ribs prevent said support frame from rocking.

2. An earthquake isolation floor as claimed in claim 1 wherein a number of horizontal dampers are disposed around said support frame substantially radially between said support frame and said fundamental frame.

3. An earthquake isolation floor as claimed in claim 1 wherein said fundamental frame has a regular polygonal configuration and said support frame has a circular configuration both in plan view, whereby said horizontal springs are disposed radially between the middles of the respective sides of said polygonal configuration and the outer periphery of said support frame.

4. An earthquake isolation floor as claimed in claim 3 wherein a number of horizontal dampers are disposed radially between every other corner of said polygonal configuration of said fundamental frame and the outer periphery of said support frame.

5. An earthquake isolation floor as claimed in claim 1, 2, 3 or 4 wherein said support frame is slidably mounted on said fundamental frame by means of sliding elements disposed therebetween.

6. An earthquake isolation floor as claimed in claim 5 wherein said sliding elements are low friction elements.

7. An earthquake isolation floor as claimed in claim 1 wherein said support frame is slidably mounted on said fundamental frame by means of sliding elements disposed therebetween.

8. An earthquake isolation floor as claimed in claim 7 wherein said sliding elements are low friction elements.

9. An earthquake isolation floor as claimed in claim 1, 2, 3 or 4 wherein a number of said earthquake isolation floors are disposed at intervals so that said support frames of said earthquake isolation floors are adapted to carry a common support frame thereon so as to mount thereon machinery and tools, etc. of relatively large dimensions or weight.

10. An earthquake isolation floor as claimed in claim 1 wherein a number of said earthquake isolation floors are disposed at intervals so that said support frames of said earthquake isolation floors are adapted to carry a common support frame thereon so as to mount thereon machinery and tools, etc. of relatively large dimensions or weight.

11. An earthquake isolation floor as claimed in claim 9 wherein said support frames are respectively slidably mounted on said fundamental frames, respectively, by means of sliding elements disposed therebetween.

12. An earthquake isolation floor as claimed in claim 11 wherein said sliding elements are low friction elements.

13. An earthquake isolation floor as claimed in claim 10 wherein said support frames are respectively slidably mounted on said fundamental frames by means of sliding elements disposed therebetween.

14. An earthquake isolation floor as claimed in claim 13 wherein said sliding elements are low friction elements.

* * * * *